United States Patent

[11] 3,567,909

[72] Inventor Dillis V. Allen
208 Euclid Ave., Arlington Heights, Ill. 60004

[21] Appl. No. 681,754
[22] Filed Nov. 9, 1967
[45] Patented Mar. 2, 1971

[54] INFORMATION HANDLING SYSTEM
3 Claims, 8 Drawing Figs.

[52] U.S. Cl. .......... 235/61.11, 250/219, 340/149
[51] Int. Cl. .......... G06k 7/10
[50] Field of Search ..........235/61.115; 250/226, 219 (ID); 340/149, 146.3

[56] References Cited

UNITED STATES PATENTS 2,268,498 12/1941 Bryce .......... 235/61.115
3,196,393 7/1965 Siegemund .......... 235/61.115
3,298,015 1/1967 Herman .......... 235/61.115
3,417,231 12/1968 Stites et al. .......... 235/61.115
3,213,179 10/1965 Clauson .......... 235/61.11

*Primary Examiner*—Thomas A. Robinson

ABSTRACT: An optical information handling system including an encoded information carrier in which information is represented by marks which transmit one of a plurality of optical wave length signals, the marks being arranged in quadricode form, and a reading and decoding network for receiving the optical wave length signals from the marks, translating the signals into a modified binary representation and decoding the modified binary representation into a true binary output.

PATENTED MAR 2 1971 3,567,909

SHEET 1 OF 2

Fig. 5.
| | | 1 | 2 | 3 | 4 | 5 | 6 | 7 | 8 | 9 | 10 |
|---|---|---|---|---|---|---|---|---|---|---|---|
| DECIMAL | | 1 | 2 | 3 | 4 | 5 | 6 | 7 | 8 | 9 | 10 |
| QUADRICODE | C1 | R | Y | B | G | G | G | R | R | R | B |
| | Q | G | G | G | R | Y | B | R | Y | B | R |
| MODIFIED BINARY A TO F | A | A | B | C | D | E | F | A | A | A | |
| | B | | | | | | | | | | B |
| | C | | | | | | | | | | |
| | D | | | | | | | D | | | D |
| | E | | | | | | | | E | | |
| | F | | | | | | | | | F | |
| BINARY | □1 | 1 | 0 | 1 | 0 | 1 | 0 | 1 | 0 | 1 | 0 |
| | □2 | 0 | 1 | 1 | 0 | 0 | 1 | 1 | 0 | 0 | 1 |
| | □3 | 0 | 0 | 0 | 1 | 1 | 1 | 1 | 0 | 0 | 0 |
| | □4 | 0 | 0 | 0 | 0 | 0 | 0 | 0 | 1 | 1 | 1 |
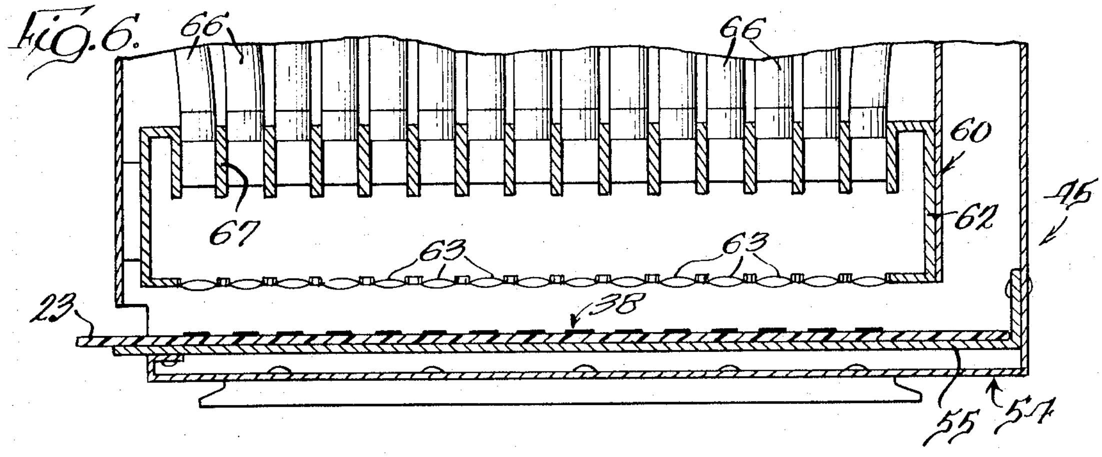
Fig. 6.
Fig. 7.
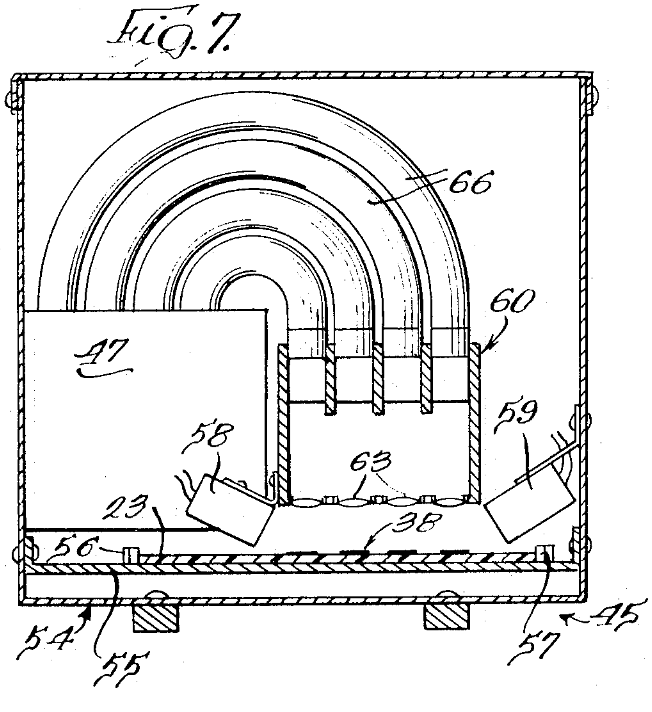
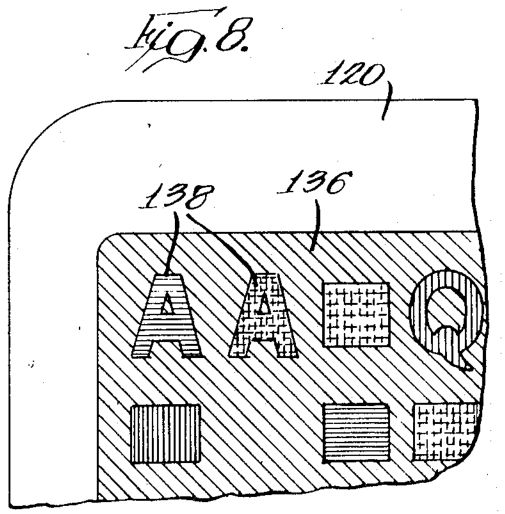
Fig. 8.

INFORMATION HANDLING SYSTEM

BACKGROUND OF THE DISCLOSURE

The expanded use of computers in the mass transportation field and in the consumer purchasing field has indicated a need for improvement in the passenger or consumer-computer interface. That is, while basic computer technology as presently known has developed sufficiently where systems are available for these general purposes the ordinary passenger or consumer is unfamiliar with the operation of computers so that in both fields, and many others, it has been found necessary to employ a great number of personnel to effect a "human interface" between the actual persons using the computer and the computer itself.

It has been suggested that passengers and consumers carry coded information bearing cards which could transmit information to the computer such as account number, credit limitations, banking connections, travel restrictions, etc. Thus, a purchaser might buy an article at a store, insert his card into a reading device which feeds information into a central computer having information feeds with the banks in the area, and the customer's account at his bank could be charged immediately and the store's account at its bank could be charged immediately. In the transportation field, such as the airlines, the card could be used to identify the passenger to the computer and thereby permit the computer to automatically reserve a space for the passenger and issue him a ticket without the need for human ticket writing personnel, at least in the numbers found today.

One reason the encoded card concepts have not received acceptance to date is in the inapplicability of presently known encoding and reading techniques to personal identification cards of this character. For example, optical scanners which read alphabetical and numerical information as presently known are much too expensive to provide in number sufficient to service consumers and passengers. The various magnetic encoding and reading devices are unsuited to this application since they are easily altered or "forged." The same disadvantage may be attributed to the various binary coded techniques including raised impressions, spots, and various shaped holes read either optically, magnetically or by mechanical contact.

SUMMARY OF THE INVENTION

This invention relates generally to information handling systems and more particularly to an optical information handling system.

In accordance with the present principles an encoded personal identification card and information reading and transmitting system is provided which obviates the above known disadvantages, and others, of prior known encoding and reading systems.

The present encoded personal identification card is constructed of plastic laminations similar to presently known personal credit cards. These cards generally have a thick central plastic core with transparent thin sheets on both sides of the core covering any printed material on the card. The cards are encoded by arranging combinations of colored marks on certain portions of the card. These colored marks may be applied to the core by presently known printing methods. The selection of one of the primary colors, e.g. red, yellow or blue, for a mark along with the selection of one of these colors for the other marks in any information group determines the information in that group.

Thus, in distinction to the well known binary system the present cards are encoded not by selecting the presence or absence of an indicium from any predetermined location on the card, but rather by selecting one of more than two colored indicia at each predetermined location on the card. For this reason the present code is of a higher order than binary representations and in the embodiment disclosed hereinbelow, the color code selected is arranged as a quadricode. That is, the base of the code, rather than being two in a binary code, is four.

For reading and translating the information encoded on the cards a reading device is provided in accordance with the present information. The reader consists of an optical system for illuminating and transmitting optical wave length signals from the marks on the card to determining circuits which through the use of filter networks and photocells determine which, if any, of the primary colors appear in each mark location on the card. The output from the photocells is decoded by a decoding circuit to provide a conventional binary output recognizable by many of the computers already known.

One of the advantages of this color coding arrangement, is that the card, once encoded, is difficult to alter. Any attempt to change or alter the color of one of the marks could be easily detected by suitable wave length testing circuitry which would authenticate the colors employed in the code. The same wave length testing circuitry would detect any card forgeries. Color testing circuits are well known and are therefore not described in detail hereinbelow.

Moreover, an additional advantage in the present encoded cards is that long use with resulting wear will not detract from the readability and integrity of the card. Since no magnetic spots or holes are employed there is no possibility of an inadvertent erasure or accidental mutilation that could cause a reading error.

An additional advantage in the present optical information system is that information can be represented in the same form while providing a readout in visual alphanumeric form for humans and in quadricode form for the computer. The colored marks encoding the present card, while shown in one embodiment as colored squares, may also take the shape of numbers and letters so that they are readable both visually and optically.

BRIEF DESCRIPTION OF THE DRAWINGS

FIG. 5 is a logical table for the reading and decoding circuits of FIGS. 3 and 4;

FIG. 6 is a sectional elevation of a reading device in accordance with the present invention;

FIG. 7 is a cross section taken generally transversely in FIG. 6; and

FIG. 8 is a plan view of a modified card in accordance with the present invention.

DETAILED DESCRIPTION OF THE PREFERRED EMBODIMENTS

Figures 1, 2, 3:
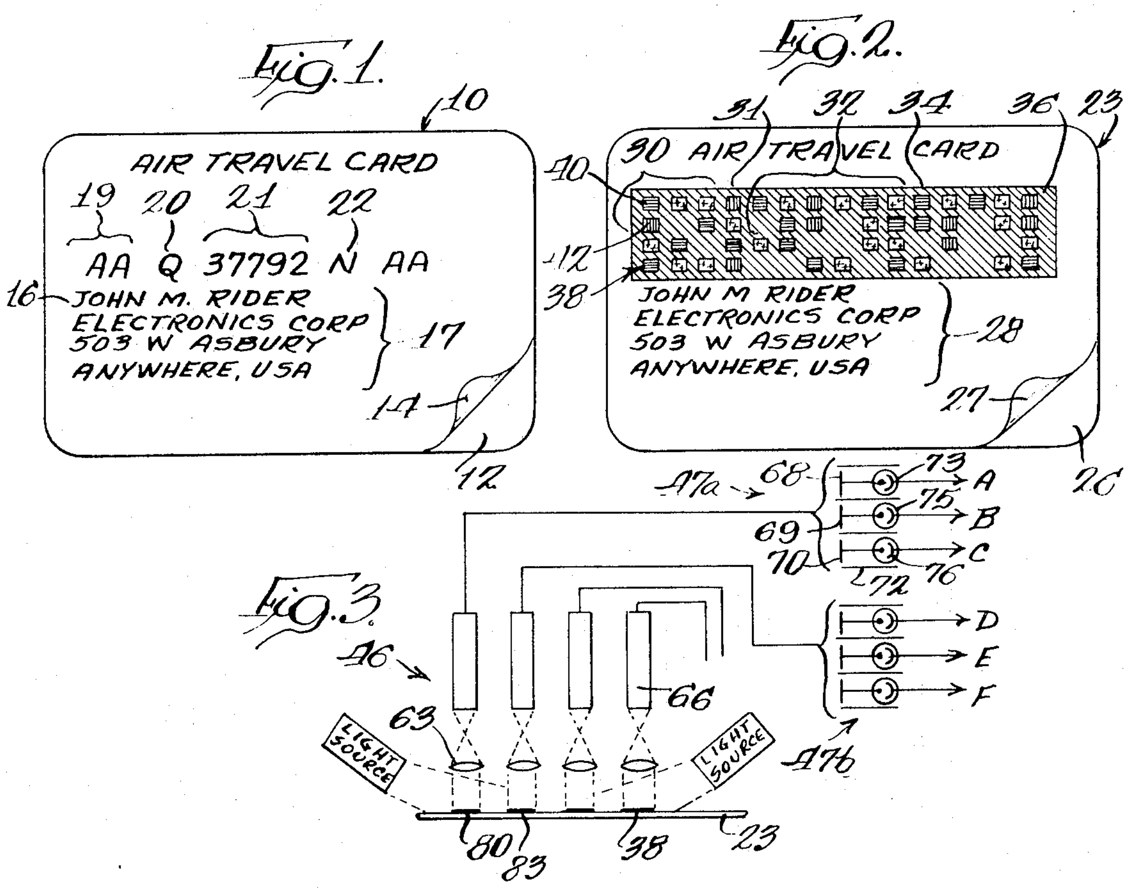
FIG. 1 is a plan view of a conventional air travel card.
FIG. 2 is a plan view of an air travel card in accordance with the present invention.
FIG. 3 is a schematic view of an optical reading circuit in accordance with the present invention.

A conventional credit card 10 as shown in FIG. 1 is seen to consist of a central opaque core sheet 12 flanked by thin transparent sheets 14. Any colored inking is generally applied to the face of core sheet 12 and thereafter the thin sheet 14 is laminated thereover to protect the inked areas. The indicia 16 representing the name and address 17 of the user, the issuing airlines 19, passenger number limitations 20, account number 21, geographical restrictions 22 are all placed on the card by physically deforming the entire thickness of the card.

It should be understood that the present invention is not limited to transportation services and applies to other forms of mass card encoding and reading.

The present personal identification card 23 also consists of a core member 26 flanked by transparent sheets of plastic 27. The passenger's name and address information 28 is applied to the card by impression similar to that shown at 17 in FIG. 1 although this information could be encoded for information handling as well. The issuing airline information 30, passenger limitation 31, account number 32, and geographical limitation 34 information are all encoded on the card 23 in a manner that may be read by the present optical reader.

All of the encoded areas are printed on the core 26 and the subsequent application of the transparent film 27 serves to protect the encoded areas. The encoded area 36 has been arbitrarily selected as green although other colors may be used as well so long as they will not reflect a wave length that will interfere with the reading of other coded colors.

Information is encoded in area 36 by printing selectively colored marks or squares such as at 38. In the present code the primary colors, red, yellow and blue, have been selected for use in representing the code. While these have been found particularly useful in the present code, other colors may be found desirable in certain cases.

The coded area is divided into a plurality of information groups such as indicated at 30, 31, 32 and 34. Each of the groups is divided into a certain number of information bearing positions, there being, for example, six positions in group 30, two positions in group 31 and twelve positions in group 32. The number of positions, it should be noted, however, does not necessarily correspond to the number of code marks or color squares 38 since they may be of a lesser number. That is, in encoding each of the positions any one of the three primary colors (red, yellow or blue) may be selected or the absence of any primary color may be selected so that each position may have four different states. Since each position or place may have four different states the present code is referred to as a quadricode. However, it should be understood that a different number of colors might be used but it is believed that the fullest advantage is taken of associated optical and decoding circuitry when a quadricode is employed.

The information in each group is arranged in two places, i.e. each decimal or alphabetical information bit is represented by the colors or absence of colors in two positions. For example, in group 30 color square 40 and color square 42 are in two positions which combine to represent one number or letter. More than two places may be employed, if desired, but for a numerical capability of zero to nine only two places are necessary in a quadricode since two positions in a quadricode will yield 15 different combinations, more than enough to give the zero to nine numeric representation.

Figure 4:
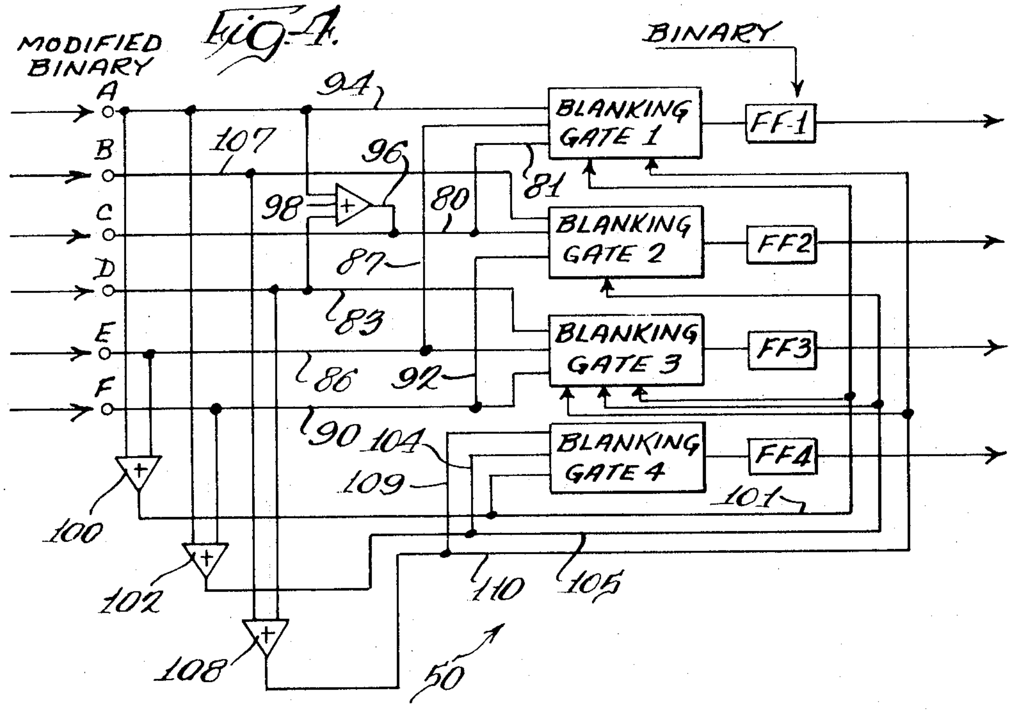
FIG. 4 is a decoding circuit for providing a binary output in accordance with the present invention.

For reading the information encoded on card 23 a reading and decoding device 45 is provided as shown in FIGS. 6 and 7 and in schematic form in FIGS. 3 and 4. The reading and decoding device 45 includes an optical reading circuit 46 and a plurality of detecting circuits 47*a*, 47*b*, etc., it being understood that all of the detecting circuits are not shown in FIG. 3.

Also included in the reading and decoding device 45 is a decoding circuit 50 shown in FIG. 4 which provides a binary output suitable for entry into the main computer (not shown).

The reading and decoding device 45 includes a frame assembly 54 and a horizontal card support 55 for card 23. As shown in FIG. 7 suitable guides 56 and 57 are provided for accurately aligning the card 23 in the reading device.

For illuminating the encoded portion 36 of the card in the reading device two sources of light 58 and 59 are provided mounted within the frame assembly 54.

A reading head 60 is fixedly mounted in the frame 54 so that it is centered above the encoded portion 36 of a card when properly positioned in the reading device. The reading head 60 consists of a boxlike frame member 62 supporting a plurality of converging lenses 63. There is provided a lens 63 for each of the positions, e.g. 40, 42 on the encoded area 36. Lenses 63 serve to project the optical wave length rays reflected from the encoded position on the card 23 adjacent thereto. The lenses are positioned close enough to the card 23 so that each lens projects only the wave length signal associated with the position adjacent thereto and not from any surrounding position.

The optical signals from the lenses 63 are projected into a light conductor 66, there being provided one light conductor for each lens 63. The light conductors are fixedly mounted in suitable openings 67 in the reading head frame 62.

The light conductors 66 transmit the optical signals projected by the lenses 63 to the detecting circuits 47*a*, 47*b*, etc., as shown in FIGS. 3 and 7. It should be understood that there is one detecting circuit provided for each of the conductors 66. The detecting circuits include a first filter 68 which passes only a narrow band of red optical wave length signals, a filter 69 which passes only a narrow band of yellow optical wave length signals and a filter 70 which passes only a narrow band of blue optical wave length signals. Suitable shields 72 separate the filters. Photocells 73, 75 and 76 are provided which respond respectively to signals transmitted through filters 68, 69 and 70. That is, photocell 73 turns on when filter 68 passes an optical signal (which can only occur when indicia or mark 80 on card 23 is red), photocell 75 will turn on only when filter 69 passes a signal and photocell 76 will turn on only when filter 70 passes a signal. Thus, the output from the detecting or determining circuit 47*a* (as well as the other determining circuits) is either an output in one of the lines A, B, C or no output at all.

When none of the primary color squares appears in a position, the lens adjacent thereto will project green through the associated conductor but the filters 68, 69 and 70 are narrow band filters and will block the green wave length signal so that none of the photocells 73, 75 or 76 will turn on.

It should be understood that there is a detecting circuit for each of the conductors 66 but only two have been shown in FIG. 3 since two are sufficient to explain the present circuitry as a two-place quadricode system. Detecting circuit 47*b* is identical to that in 47*a* and the output of this circuit is a signal in one of lines D, E or F or a signal in none of these lines in response to the reading of position 83 on the card 23.

The decoding circuit 50 as shown in FIG. 4 is only that required for the two detecting circuits 47*a* and 47*b* as shown in FIG. 3 so that it should be understood that a decoding circuit similar to that shown in FIG. 4 is provided for each pair of detecting circuits 47. The decoding circuit 50 receives the modified binary output from the detecting circuits 47*a* and 47*b* and converts these signals into a conventional binary representation. The A, B, C, D, E, F inputs at the left of FIG. 4 are connected to receive signals from the A, B, C, D, E, F outputs of the detecting circuits 47*a* and 47*b* as shown in FIG. 3.

The operation and logic of the decoding circuit 50 is best explained with reference to the logical table in FIG. 5. It has been assumed that it is desired to achieve ten different information bits indicated in decimal fashion one to ten in FIG. 5. As explained above, however, up to fifteen can be achieved with the present code employing two positions. The decimal "one" has been arbitrarily represented by a red mark in the upper position and no mark in the lower position (which will appear green and is indicated G in the table since the background of the code area 36 is green). The quadricode line on the table in FIG. 5 indicates actual color combinations in each of two upper and lower exemplary positions in one of the groups on the encoded area 36 of the card itself. The modified binary lines on the table of FIG. 5 indicates which of the lines A through F is energized in response to certain combinations of colors in the two code positions, this being the output from the determining circuits 47*a* and 47*b*. The binary lines on the table in FIG. 5 indicate the state of the four binary places in the output of the decoding circuit 50. From a comparison of the decimal line and the binary line in the table of FIG. 5 it may be seen that the decoding circuit provides a conventional one, two, four, eight binary output.

The decimal "one" has in the present code been arbitrarily selected as a combination of red in the upper position and no mark in the lower position as shown in FIG. 5. When the detecting circuit 47*a* receives a red wave length signal from its associated conductor 66, photocell 73 will turn on providing an output in line A. Lines B and C will be at a low level at this time. Detector 47*b* will provide no output since the conductor 66 associated with this detecting circuit projects a green wave length signal which is substantially blocked by the filters in circuit 47*b*. An input at line A turns flip-flop FF1 on and since none of the other flip-flops FF2, FF3 or FF4, is on at this time, a conventional binary one output is achieved.

The decimal two has been arbitrarily represented as a yellow mark or indicium in the upper position and no indicium in the lower position. This provides an output from the detecting circuits 47*a* and 47*b* only in line B. The decoding circuit 50 responds to a signal in line B to turn flip-flop FF2 on. None of the other flip-flops are turned on at this time so that the decoding circuit provides an output signal from the second binary place indicating the decimal two.

The decimal three has been arbitrarily represented by a blue indicium in the upper position and no indicium or mark in the lower position. This provides an output from the detecting circuit only in line C. The decoding circuit 50 responds to a signal in line C to turn flip-flop FF2 on through line 80 and flip-flop FF1 on through line 81. Since the one and two output lines are thus "on" a binary three output is provided from the decoding circuit 50.

The decimal four has been arbitrarily represented by a combination of green (no mark) in the upper position and red in the lower position. The reading circuit 46 responds to this color combination to provide green wave length signals to the detecting circuit 47*a* and red wave length signals for detecting circuit 47*b*. In response to green wave length signals the detecting circuit 47*a* provides no output in any of the lines A, B or C, while the detecting circuit 47*b* in response to red wave length signals provides an output in line D. The decoding circuit 50 in response to an input at line D turns the flip-flop FF3 on through line 83 providing a four output in the third binary place.

The decimal five has been arbitrarily represented by no mark in the upper position and a yellow mark or indicium in the lower position. In response to this combination detecting circuit 47*a* will provide no output and detecting circuit 47*b* will provide an output in line E. The decoding circuit 50 responds to an output in line E to turn flip-flop FF3 on through line 86 and to turn flip-flop FF1 on through line 87, thus providing a five binary output in the first and third binary places.

The decimal six has been arbitrarily represented by no indicium in the upper position and a blue mark or indicium in the lower position. Of course, the detecting circuit 47*a* provides no output in response to the green background in the upper position. The detecting circuit 47*b*, however, provides an output in line or channel F in response to a blue wave length signal. In response to a signal in line F in the decoding circuit, flip-flop FF3 is turned on through line 90 and flip-flop FF2 is turned on providing an output in the second and third binary places.

The decimal seven has been arbitrarily represented by red indicia in the upper and lower positions as indicated in the table. Detecting circuit 47*a* responds to a red wave length signal to provide an output in line A while detecting circuit 47*b* responds to a red wave length signal to provide an output in line D. With signals in lines A and D in the detecting circuit 50 flip-flops FF1, FF2, and FF3 turn on. Flip-flop FF1 is turned on through line 94; flip-flop FF3 is turned on through line 83; and flip-flop FF2 is turned on through line 96 which is energized when AND gate 98 provides an output in response to signals in both lines 94 and 83 (which occurs when inputs are found at A and D). Thus the decoding circuit will provide outputs in the first three binary places representing the decimal seven.

The decimal eight has been arbitrarily represented by a red indicium in the upper position and a yellow indicium in the lower position. In response to this condition the detecting circuits provide an A, E output. In response to an A, E output decoding circuit 50 turns on flip-flop FF4 through AND gate 100 which responds to signals in lines 94 and 86. When AND gate 100 provides a signal through line 101 the blanking gate 3 and blanking gate 1 prevent the energization of flip-flops FF1 and FF3 at this time. Thus, only an output is found in the fourth binary place representing the number eight.

The decimal nine has been arbitrarily represented by a red indicium in the upper position and a blue indicium in the lower position as indicated in the table of FIG. 5. In response to this the detecting circuits provide an A, F output and AND gate 102 turns on flip-flop FF4 through line 104. Flip-flop FF1 is turned on through line 94 while blanking gates 2 and 3 prevent flip-flops FF2 and FF3 from turning on by a signal in line 105. This produces an output in the first and fourth binary places representing the number nine.

The decimal ten has been arbitrarily represented by a blue indicium in the upper position and a red indicium in the lower position. In response to this the detecting circuits provide a B, D output which when applied to the decoding circuit 50 turns the flip-flops FF2 and FF4 on. The flip-flop FF2 is turned on through line 107 and the flip-flop FF4 is turned on by AND gate 108 which energizes line 109. A signal in line 110 from this AND gate enables the blanking gates 1 and 3 to prevent the flip-flops FF1 and FF3 from turning on at this time. This provides an output in the second and fourth binary places representing the number ten.

Further, the decoding circuit 50 is provided with suitable circuitry (not shown) for resetting the flip-flops after each card 23 is read so that they are in their "off" states just prior to receiving information from the detecting circuits.

According to the present invention the card may be encoded to provide both a visual representation of the information in addition to the color quadricoded information. Toward this end and as shown in FIG. 8, a card 120 is provided similar in construction to card 23 having an encoded area 136. The information is encoded in area 136 in the same manner as in area 36 shown in FIG. 2. In this card, however, a letter or number, such as at 138 in the color of the code described with references to FIGS. 1 to 7, is printed in the upper position in place of the square indicium but in the color of the indicium it replaces. The reader 45 responds only to the color of the letters 138 so that the card 120 may be quadricoded in the same manner as the card 23. However, since the indicia 138 are in the shape of the letters or numbers represented by the color of the letter or number and the adjacent color square, the information on the card may be read both visually and with the reader.

Having described my invention as related to the embodiments shown in the accompanying drawings, it is my intention that the invention be not limited by any of the details of description, unless otherwise specified, but rather be construed broadly within its spirit and scope as set out in the accompanying claims.

I claim:

1. An optical information system, comprising: encoded means bearing information in the form of indicia each transmitting a signal in one of a plurality of optical wavelength bands, the indicia being received selectively in a plurality of predetermined places for each alphabetical or numeric information bit so that the base of code is determined by the number of bands or colors plus one, means for receiving optical signals including a plurality of optical receivers each associated with a predetermined place on said encoded means for reading the indicium in that place, means for determining within which wavelength band the signal from each receiver falls including a determining circuit associated with each receiver, each of said determining circuits having a plurality of channels equal in number to the number of predetermined wavelength bands, means providing one output signal from each of the determining circuits, and means combining the output signals of the determining circuits associated with the same information bit.

2. An optical information system as defined in claim 1, and decoder means connected to receive the output signals from the determining circuits and convert them to a time binary output representation.

3. An optical information system and an encoded card providing a representation of information in two forms, comprising:

card means for receiving information, a plurality of information areas on said card means, each of said information areas including at least two predetermined positions for receiving indicia, each information bit being represented by the presence or absence of indicia in at least two positions, indicia selectively placed in said positions to represent the desired information, said indicia each adapted to transmit an optical wavelength within one of a plurality of optical wavelength bands so that the information may be read optically, the indicium in one of the positions being in the form of alphabetical or numerical representations of the same information so that the information may be read visually;

means for receiving optical signals including a plurality of optical receivers each associated with a predetermined place on said encoded means for reading the indicium in that place, means for determining within which wavelength band the signal from each receiver falls including a determining circuit associated with each receiver, each of said determining circuits having a plurality of channels equal in number to the number of predetermined wavelength bands, each of said channels determining whether the signal from the receiver falls within one of the wavelength bands, means providing one output signal from each of the determining circuits; and means combining the output signals of the determining circuits associated with the same information bit.